US011151172B2

(12) United States Patent
Sathe et al.

(10) Patent No.: US 11,151,172 B2
(45) Date of Patent: *Oct. 19, 2021

(54) ACCESSING FACETED INFORMATION USING ONTOLOGIES (71) Applicant: International Business Machines Corporation, Armonk, NY (US)

(72) Inventors: Hrishikesh Sathe, Sunnyvale, CA (US); Sheng Hua Bao, San Jose, CA (US); William S. Spangler, San Martin, CA (US); Xiaoyang Gao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/449,693

(22) Filed: Jun. 24, 2019

(65) Prior Publication Data

US 2019/0332614 A1 Oct. 31, 2019

Related U.S. Application Data (63) Continuation of application No. 15/964,299, filed on Apr. 27, 2018.

(51) Int. Cl.
*G06F 16/28* (2019.01)
*G06F 16/93* (2019.01)
(Continued)

(52) U.S. Cl.
CPC .......... *G06F 16/288* (2019.01); *G06F 16/248* (2019.01); *G06F 16/285* (2019.01); *G06F 16/93* (2019.01); *G06F 16/9535* (2019.01)

(58) Field of Classification Search
CPC ...... G06F 16/367; G06F 40/30; G06F 16/248; G06F 16/93; G06F 16/285; G06F 16/35;
(Continued)

(56) References Cited

U.S. PATENT DOCUMENTS 8,135,711 B2 3/2012 Charnock
8,874,552 B2 10/2014 Jehuda
(Continued)

OTHER PUBLICATIONS

Weikum, G. et al.; "From Information to Knowledge: Harvesting Entities and Relationships from Web Sources"; PODS '10; Jun. 2010.

(Continued)

*Primary Examiner* — Yuk Ting Choi
(74) *Attorney, Agent, or Firm* — Will Stock; Edell, Shapiro & Finnan, LLC (57) ABSTRACT Methods, systems and computer readable media are provided for accessing faceted information using ontologies. Information for an initial entity, including different ontologies to which the initial entity belongs, is retrieved. Entities within different ontologies are determined. The determined entities and different ontologies are displayed on a user interface to enable traversal of the different ontologies for viewing of the determined entities. Accordingly, a user may search for an initial entity. Different ontologies, linked to the initial entity may be returned. A user may select an ontology, and ontologies in which the initial entity belongs are displayed. The user may select any of the displayed ontologies to access other entities in the selected ontology.

6 Claims, 6 Drawing Sheets (51) Int. Cl.
*G06F 16/9535* (2019.01)
*G06F 16/248* (2019.01)

(58) Field of Classification Search
CPC ........ G06F 16/355; G06F 7/00; G06F 16/258;
G06F 16/00; G06F 16/28; G06F 16/9535;
G06N 5/02
See application file for complete search history.

(56) References Cited

U.S. PATENT DOCUMENTS

| | | |
|---|---|---|
| 2003/0177112 A1 | 9/2003 | Gardner |
| 2006/0053382 A1 | 3/2006 | Gardner et al. |
| 2010/0211534 A1* | 8/2010 | Stergiou ................. G06F 16/36 706/12 |
| 2011/0264649 A1* | 10/2011 | Hsiao .................... G06N 5/022 707/722 |
| 2012/0233160 A1 | 9/2012 | Koomullil et al. |
| 2013/0013580 A1 | 1/2013 | Geller et al. |
| 2016/0103912 A1* | 4/2016 | Daggett ................. G16H 50/70 707/736 |
| 2016/0140439 A1 | 5/2016 | Adderly et al. |
| 2018/0218071 A1 | 8/2018 | Donndelinger et al. |
| 2019/0332714 A1 | 10/2019 | Sathe et al. |

OTHER PUBLICATIONS

Nedellec, C. et al.; "Ontologies and Information Extraction"; LIPN Internal Report, 2005.; Jul. 2005.

Anonymously; "Natural Language Semantics in Support of Knowledge Base Searching and Computer Aided Troubleshooting"; http://ip.com/IPCOM/000246121D; May 10, 2016.

Anonymously; "System and Method for Transforming Entity Relationship Models into OWL Ontologies and Vice Versa"; http://ip.com/IPCOM/000226433D; Apr. 3, 2013.

Anonymously; "System and Method for Using Hypernym Trees to Enable Concept and Topic Based Searches"; http://ip.com/IPCOM/000224413D; Dec. 18, 2012.

List of IBM Patents or Patent Applications Treated as Related, filed Jun. 24, 2019.

* cited by examiner

FIG.1

SEARCH FOR ENTITY: ZN

RESULTS:

| ENTITY NAME | ONTOLOGY TYPE | ONTOLOGY NAME |
|---|---|---|
| [ZN] | DRUG-ATC | ALIMENTARY TRACT AND METABOLISM |
| [ZN] | DRUG-CTGRY | ACETATES |
| [ZN] | DRUG-CLASSIFICATION | INORGANIC COMPOUNDS |

FIG.2A

SELECTION OF ONTOLOGY "ALIMENTARY TRACT AND METABOLISM"

RESULTS:

| ENTITY NAME | ONTOLOGY TYPE | ONTOLOGY NAME |
|---|---|---|
| [F-][Na+] | DRUG-ATC | ALIMENTARY TRACT AND METABOLISM |
| IDURSULFASE | DRUG-ATC | ALIMENTARY TRACT AND METABOLISM |
| OC(=O)CC(O) | DRUG-ATC | ALIMENTARY TRACT AND METABOLISM |

ACCESSING FACETED INFORMATION USING ONTOLOGIES

BACKGROUND

1. Technical Field

Present invention embodiments relate to accessing faceted information, and in particular, to using ontologies to access faceted information.

2. Discussion of the Related Art

In recent years, advances in computing and artificial intelligence have enabled routine ingestion of large data sets. While numerous types of systems are able to ingest large data sets, analyzing the information and presenting the information to the user in a way that enables interpretation remains difficult. In some aspects, databases may classify entities into a plurality of ontologies. While searching for an entity in such systems returns information about the entity, understanding the context of the entity is often limited.

SUMMARY

According to embodiments of the present invention, methods, systems and computer readable media for accessing faceted information using ontologies are provided. Information for an initial entity including different ontologies to which the initial entity belongs is retrieved. Entities within the different ontologies are determined. The determined entities and different ontologies are presented on a user interface to enable traversal of the different ontologies for viewing of the determined entities. In an embodiment, ontologies may be traversed in a recursive manner, in which an initial entity returns a set of different ontologies. An ontology is selected, and entities corresponding to the selected ontology (co-occurring entities) are returned. This process may be repeated, allowing a user to traverse through a network of entities linked to ontologies.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

Figure 1:
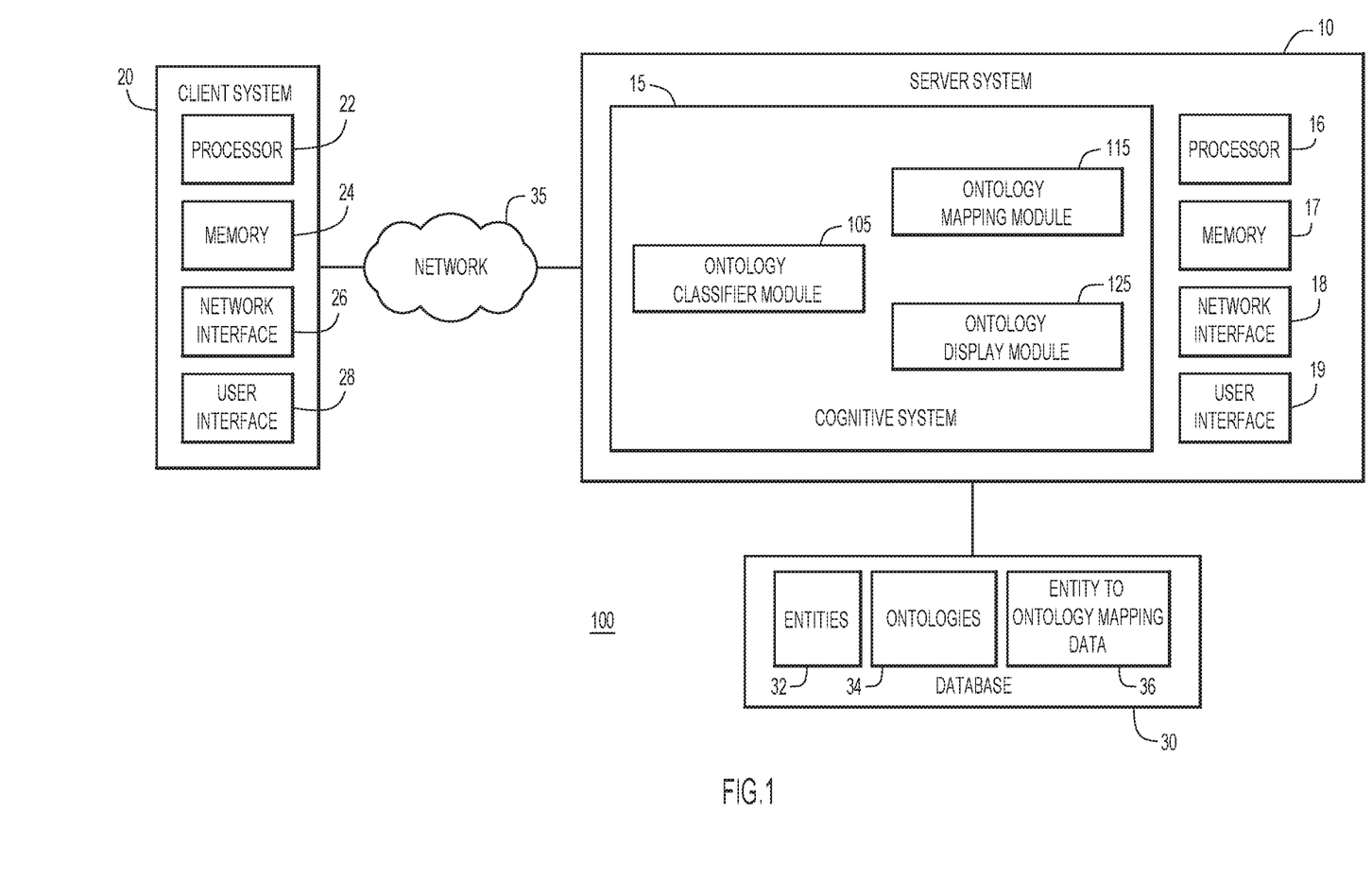
FIG. 1 is a block diagram of an example computing environment for accessing multifaceted information in accordance with embodiments of the present disclosure.

An example environment for use with present invention embodiments is illustrated in FIG. 1. Specifically, the environment 100 includes one or more server systems 10 and one or more client or end-user systems 20. Server system 10 and client system 20 may be remote from each other and may communicate over a network 35. The network may be implemented by any number of any suitable communications media (e.g., wide area network (WAN), local area network (LAN), Internet, Intranet, etc.). Alternatively, server system 10 and client system 20 may be local to each other, and may communicate via any appropriate local communication medium (e.g., local area network (LAN), hardwire, wireless link, Intranet, etc.).

Client system 20 enables users to interact with server system 10 to analyze large sets of data (e.g., data from documents, etc.) and to determine relationships between entities and ontologies (e.g., documents comprising medical information, biological information, chemical and scientific information, etc.). The server systems include a cognitive system 15, which comprises various modules to access multi-faceted information.

A database system 30 may store various information for the analysis (e.g., entities 32, ontologies 34, entity to ontology mapping data 36, etc.). The database system may be implemented by any conventional or other database or storage unit, may be local to or remote from server system 10 and client system 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis (e.g., input of entities and selection of corresponding different ontologies), and may provide reports including analysis results (e.g., a display showing entity and ontology relationships, etc.).

Server system 10 and client system 20 may be implemented by any conventional or other computer systems preferably equipped with a display or monitor, a base (e.g., including at least one processor 16, 22 one or more memories 17, 24 and/or internal or external network interfaces or communications devices 18, 26 (e.g., modem, network cards, etc.)), optional input devices or user interfaces 19, 28 (e.g., a keyboard, mouse or other input device), and any commercially available and custom software (e.g., server/client communications software, cognitive system 15 software, etc.).

Alternatively, client system 20 may facilitate access of multifaceted information when operating as a stand-alone unit. In a stand-alone mode of operation, the client system stores or has access to the data (e.g., entities 32, ontologies 34, entity to ontology mapping data 36, etc.), and includes a cognitive system 15 to facilitate access of multifaceted information. The graphical user (e.g., GUI, etc.) or other interface (e.g., command line prompts, menu screens, etc.) solicits information from a corresponding user pertaining to the desired entity, and may provide ontologies corresponding to the entity based on the techniques provided herein.

Cognitive system 15 may include one or more modules or units to perform the various functions of present invention embodiments described below. The various modules (e.g., ontology classifier module 105, ontology mapping module 115, ontology display module 125, etc.) may be implemented by any combination of any quantity of software and/or hardware modules or units, and may reside within memory 17 of the server and/or client systems for execution by processors 16, 22. Ontology classifier module 105 classifies entities as belonging to one or more ontologies. In some aspects, an ontology may be provided by a user. In other aspects, the system may generate the ontology and classify entities based on the ontology. Ontology mapping module 115 maps entities to one or more ontologies, allowing entities to be linked to entire sets of information in mapped ontologies, instead of being limited to the selected entity.

Ontology display module 125 allows a user to traverse between entities and ontologies, by selecting entities or ontologies, according to the techniques provided herein. These modules are described in additional detail below, and with reference to the figures.

Figure 2A:
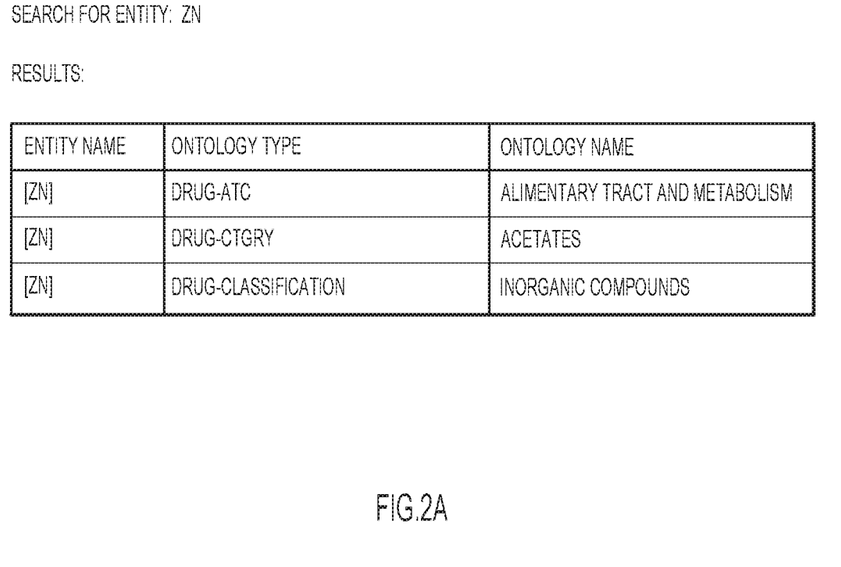
FIGS. 2A-2C are graphical illustrations of traversing an ontology in accordance with embodiments of the present disclosure.

FIG. 2 shows example search results of searching for an entity in a system comprising multifaceted information. In this example, the initial entity 'Zn' for zinc is provided as input to cognitive system 15. In some aspects, a synonym for the entity may be entered into the search field, and the system may normalize the synonym to the canonical name of the entity.

The system may comprise any number of entities, and each entity may be linked to any number of ontologies. An entity in some systems may include a gene name, a chemical name or structure, a drug name, or a disease name. In general, an ontology is the class to which an entity belongs. For example, a specific drug may be assigned to an ontology, while a gene name may be assigned to a different ontology. Other entities may be assigned to the same ontology as the drug, e.g., including but not limited to, structurally similar compounds, or compounds having a similar mechanism or mode of action as the drug, etc.

Ontologies may be derived from structured sources, which are parsed and loaded into the database such that a many-to-many mapping of ontologies and entities is generated. In general, each ontology can have one or more entities, and each entity can also belong to one or more ontologies.

Structured information and documents may be retrieved relating to the initial entity as well as the various ontologies to which the initial input entity belongs. For example, ontology information may be presented, showing different classes/categories to which the initial input entity belongs to. Mapping and display of such ontologies provides for faceted browsing of co-occurring entities in a respective ontology as well as corresponding documents.

As an example, search results for the initial input entity 'Zn' include three different ontologies: Alimentary Tract and Metabolism, Acetates, and Inorganic Compounds. Any of these ontologies may be selected to access co-occurring entities within the same ontology as the initial entity, in this case, 'Zn'.

Figure 2B:
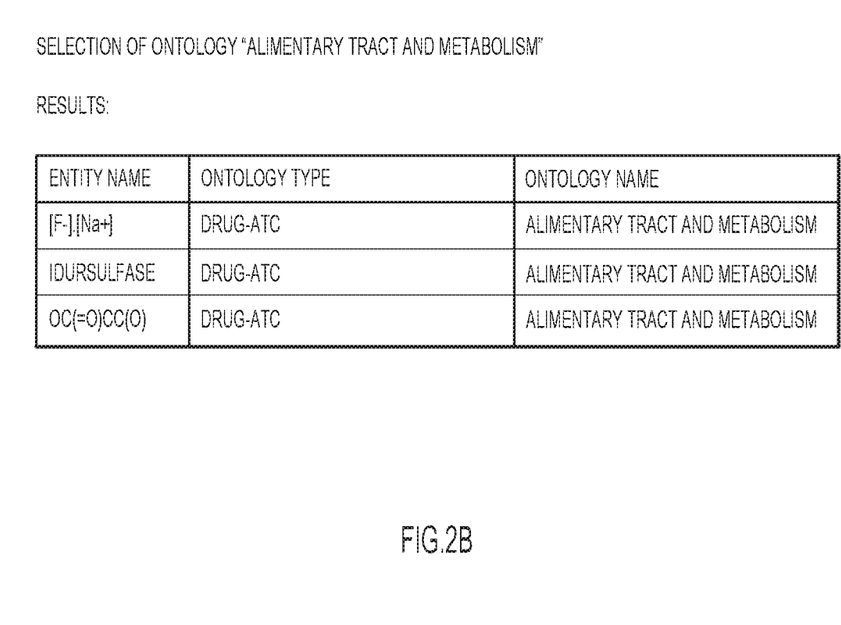

FIG. 2B shows the results of selecting the ontology entitled Alimentary Tract and Metabolism. Once this ontology is selected, the user may view co-occurring entities in the selected ontology. In this case, the co-occurring entities are [F−].[Na+], IDURSULFASE, and OC(=O)CC(O), which each share the ontology "Alimentary Tract and Metabolism".

This process may be repeated across all ontologies and entities. An entity within the Alimentary Tract and Metabolism may be selected, e.g., OC(=O)CC(O), and co-occurring entities and documents for this selected chemical structure ontology may be provided. In some embodiments, this process may be repeated three or more times.

Thus, the user may enter an initial entity to retrieve different ontologies to which the initial entity belongs; may retrieve different entities (e.g., co-occurring entities) by selection of a different ontology; may select a co-occurring entity to retrieve associated ontologies of the co-occurring entity, and so forth. This technique provides for a way to a user to browse through a system having mapped entity to ontology relationships. Relationships for the initial entity, e.g., to other ontologies and other entities, may be identified based on relationships of similar entities (with regard to the initial entity) to other entities.

In other aspects, entities co-occurring with the initial or determined entities may be identified within a common document. Co-occurring entities may be filtered based on ontologies of the co-occurring entities. For example, with regard to FIGS. 2A-2B, a user may wish to display documents comprising the initial entity and a determined entity, within an ontology, e.g., documents comprising "Zn" and "idursulfase" within the ontology "alimentary tract and metabolism".

In still other aspects, documents containing the initial or determined entities may be filtered based on ontologies of those entities. For example, with regard to FIGS. 2A-2B, a user may wish to display documents comprising the initial entity within an ontology, e.g., documents comprising "Zn" within the ontology "alimentary tract and metabolism". Alternatively, a user may wish to display documents comprising a determined entity within an ontology, e.g., documents comprising "idursulfase" within the ontology "alimentary tract and metabolism".

Figure 2C:
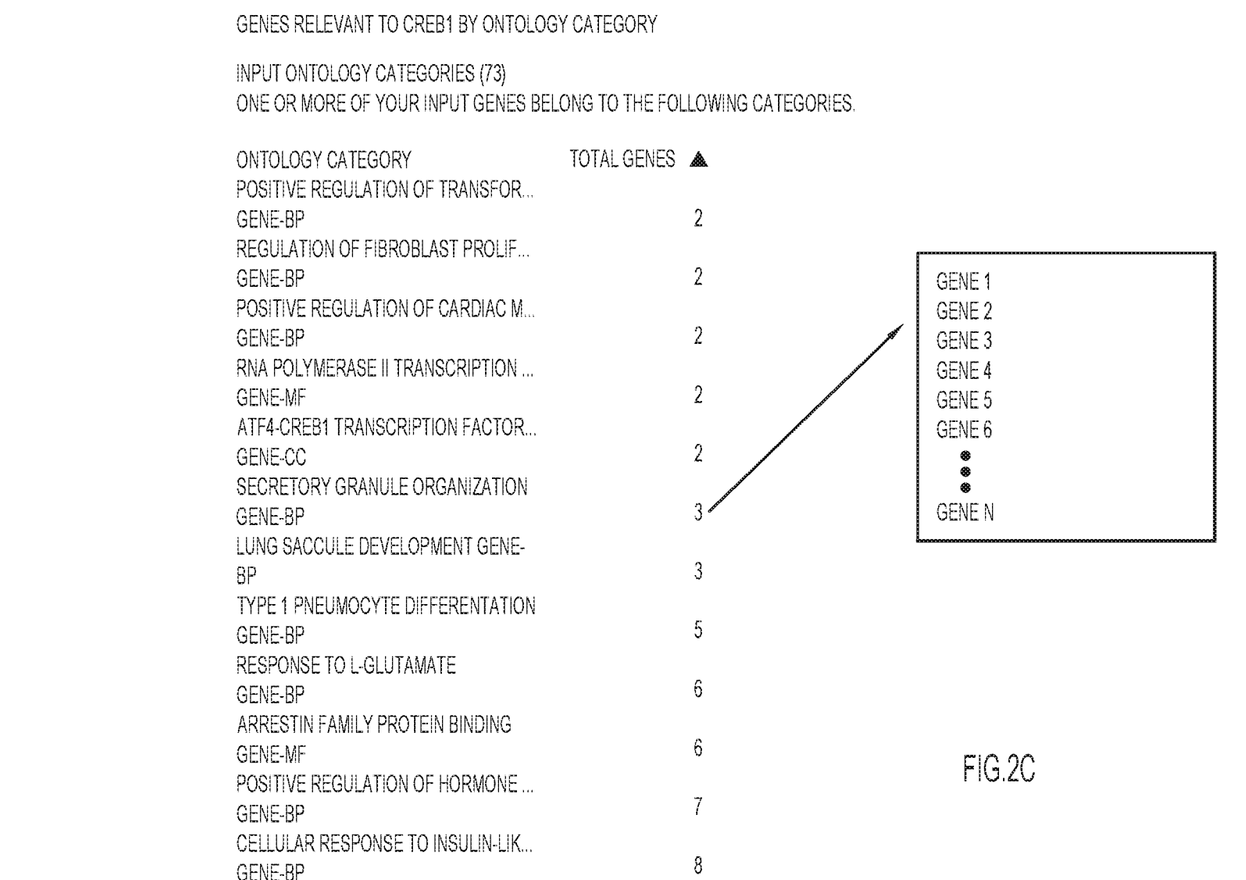

FIG. 2C shows an example implementation of present invention embodiments. In this example, a user searches for genes relevant to CREB1. A list of different ontology categories are returned. A user may select an ontology category, e.g., "Secretory Granule Organization" to return genes related to CREB1 (e.g., gene 1-gene 3) and all other genes in the selected ontology category (e.g., gene 4-gene N).

Figure 3:
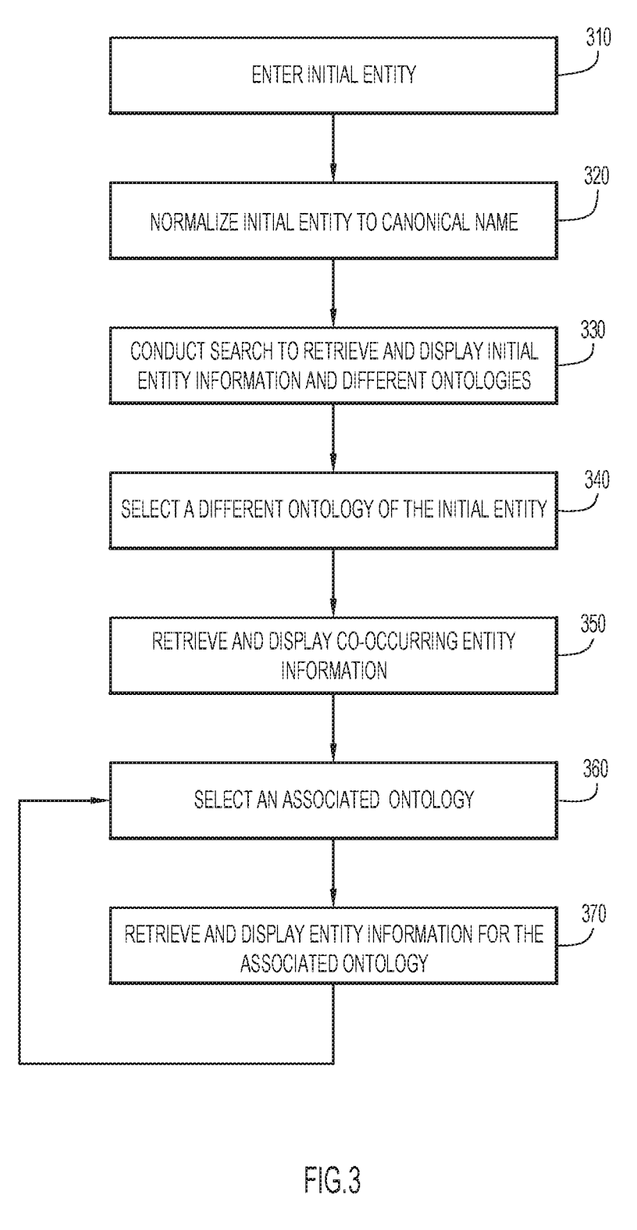
FIG. 3 is a flowchart of an example computer-implemented method of accessing multifaceted information in accordance with embodiments of the present disclosure.

FIG. 3 shows a flowchart of example operations of accessing faceted information. At operation 310, a user enters a search term which is the initial entity (or a synonym thereof) via a user interface. At operation 320, if the search term is a synonym, the system may normalize the search term to one of the canonical names for the entity, present within the cognitive system (e.g., entity data 32). After normalization (if applicable) to a canonical name, a search may be conducted at operation 330 to return information pertaining to the initial entity, and also to different ontologies that the initial entity belongs to. In some aspects, all the ontologies for a particular initial entity are returned. At operation 340, a different ontology of the initial entity is selected, and at operation 350, co-occurring entities belonging to the selected different ontology are returned and displayed to the user.

A user may select an associated ontology at operation 360 (e.g., an ontology of the co-occurring entities), and may return and display another set of entities at operation 370. By repeating operations 360 and 370, additional entity/ontology relationships may be accessed, allowing the user to browse through multi-faceted information using cognitive system 15.

Additionally, a user may browse/filter co-occurring entities or documents. During the process of finding co-occurring entities, all ontologies for the co-occurring entities may be found, allowing a user to group, filter, and browse the co-occurring entities by ontology.

Figure 4:
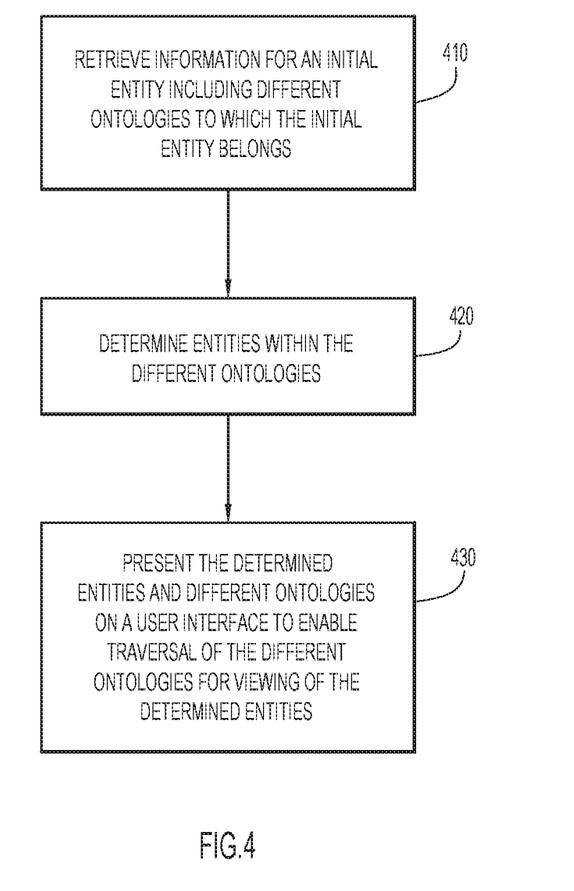
FIG. 4 is a high-level flowchart of an example computer-implemented method of accessing multifaceted information in accordance with embodiments of the present disclosure.

FIG. 4 shows a flowchart of example operations at a high level of accessing faceted information. According to operation 410, information is retrieved for an initial entity including different ontologies to which the initial entity belongs. According to operation 420, entities within the different ontologies are determined. According to operation 430, the determined entities and different ontologies are presented on a user interface to enable traversal of the different ontologies for viewing of the determined entities.

It will be appreciated that the embodiments described above and illustrated in the drawings represent only a few of the many ways of implementing embodiments for accessing multi-faceted information.

Present invention embodiments pertain to enhancing entity look-up by providing information about the different ontologies/classes to which the entity belongs to provide a faceted search. The user is able to browse through the various ontologies/classes to view the different entities, or leverage the ontologies to filter or browse the co-occurring entities and documents for the entered entity.

Additionally, new relationships may be discovered using the present techniques. For example, a user of the system may discover new relationships between entities and ontologies that would otherwise not be apparent, without classification of entities into ontologies. For example, if a user is interested in identifying compounds to treat a particular disease, the system may facilitate identification of entities (e.g., as pharmacological leads or pharmacological targets) based on an ontological classification. For example, and in reference to biological pathways, classification of entities into ontologies may reveal connections in biological pathways, e.g., for pathways thought to be divergent or unrelated. Accordingly, a pharmacological drug that affects the first pathway may also be a candidate for affecting the second pathway. Accordingly, such techniques allow novel relationships to be discovered by virtue of ontologies, and improve the operation of the system by connecting entities to ontologies, thereby allowing browsing and filtering of information that was previously not accessible.

The environment of the present invention embodiments may include any number of computer or other processing systems (e.g., client or end-user systems 20, server systems 20, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, cognitive module 15 and corresponding submodules, etc.). These systems may include any types of monitors and input devices (e.g., keyboard, mouse, voice recognition, etc.) to enter and/or view information.

It is to be understood that the software (e.g., cognitive system 15, ontology classifier module 105, ontology mapping module 115, and ontology display module 125, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardware, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., cognitive system 15, ontology classifier module 105, ontology mapping module 115, and ontology display module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardware, wireless link, Intranet, etc.).

The system may employ any number of any conventional or other databases, data stores or storage structures (e.g., files, databases, data structures, data or other repositories, etc.) to store information (e.g., entities 32, ontologies 34, entity to ontology mapping data 36, etc.). The database system may be implemented by any number of any conventional or other databases, data stores or storage structures (e.g., files, databases, data structures, data or other repositories, etc.) to store information (e.g., entities 32, ontologies 34, entity to ontology mapping data 36, etc.). The database system may be included within or coupled to the server and/or client systems. The database systems and/or storage structures may be remote from or local to the computer or other processing systems, and may store any desired data (e.g., entities 32, ontologies 34, entity to ontology mapping data 36, etc.).

The present invention embodiments may employ any number of any type of user interface (e.g., Graphical User Interface (GUI), command-line, prompt, etc.) for obtaining or providing information (e.g., entities 32, ontologies 34, entity to ontology mapping data 36, etc.), where the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The ontology display may include any information arranged in any fashion, and may be configurable based on rules or other criteria to provide desired information to a user (e.g., entity to ontology mapping, entities, ontologies, etc.).

The present invention embodiments are not limited to the specific tasks or algorithms described above, but may be utilized for any set of data in which entity ontology relationship information is needed. The data may represent biological data, chemical data, medical data, etc. In other aspects, the data may be from other scientific or technical disciplines.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of searching ontologies for an entity in a data processing system comprising at least one processor and at least one memory, the at least one memory comprising instructions executed by the at least one processor to cause the at least one processor to search the ontologies, the method comprising:
    classifying entities as belonging to the ontologies to provide relationships between the entities and the ontologies;
    retrieving information for a first entity of a search including different ontologies to which the first entity belongs;
    presenting the different ontologies of the first entity on a user interface and selecting a presented ontology of the first entity;
    determining second entities co-occurring with the first entity within a common document of the selected ontology of the first entity;
    presenting the determined second entities co-occurring with the first entity on the user interface;
    selecting a presented second entity on the user interface and retrieving information for the second entity including different ontologies to which the second entity belongs;
    presenting the different ontologies of the second entity on the user interface and selecting a presented ontology of the second entity, wherein a relationship of the first entity to the selected ontology of the second entity is not provided by the classification of the entities;
    determining third entities co-occurring with the second entity within a common document of the selected ontology of the second entity;
    presenting the determined third entities co-occurring with the second entity on the user interface and selecting a presented third entity on the user interface;
    identifying a new relationship for the first entity to the selected ontology of the second entity based on traversing the selected ontologies of the first and second entities;
    identifying a relationship between the first entity and the third entity based on co-occurrence of the first entity and the second entity in the common document of the selected ontology of the first entity and co-occurrence of the second entity and the third entity in the common document of the selected ontology of the second entity; and
    searching documents of the ontologies for the search by determining different ontologies for co-occurring entities of the selected ontologies of the first and second entities, filtering the co-occurring entities by ontology for browsing, and displaying the documents containing at least one of the browsed co-occurring entities and one of the first, second, and third entities.

2. The method of claim 1, further comprising:
determining entities within the different ontologies of the first entity similar to the first entity.

3. The method of claim 2, further comprising:
identifying additional relationships for the first entity based on relationships of the similar entities to other entities.

4. The method of claim 1, further comprising:
filtering the co-occurring second entities of the selected ontology of the first entity based on ontologies of the co-occurring second entities.

5. The method of claim 1, further comprising:
filtering documents containing the first, second, or third entities based on ontologies of those entities.

6. The method of claim 1, further comprising:
repeating selecting, determining and presenting ontologies and co-occurring entities to identify additional relationships.

* * * * *